(12) United States Patent
Zhu et al.

(10) Patent No.: US 11,566,892 B2
(45) Date of Patent: Jan. 31, 2023

(54) AIR DATA PROBE

(71) Applicant: Ohio University, Athens, OH (US)

(72) Inventors: Jianchao Zhu, Athens, OH (US); Miguel Sosa Sempertegui, Athens, OH (US); Stuart Randle, Bexley, OH (US)

(73) Assignee: Ohio University, Athens, OH (US)

( * ) Notice: Subject to any disclaimer, the term of this patent is extended or adjusted under 35 U.S.C. 154(b) by 820 days.

(21) Appl. No.: 16/341,601

(22) PCT Filed: Oct. 27, 2017

(86) PCT No.: PCT/US2017/058756
§ 371 (c)(1),
(2) Date: Apr. 12, 2019

(87) PCT Pub. No.: WO2018/081559
PCT Pub. Date: May 3, 2018

(65) Prior Publication Data
US 2021/0333099 A1 Oct. 28, 2021

Related U.S. Application Data

(60) Provisional application No. 62/413,653, filed on Oct. 27, 2016.

(51) Int. Cl.
G01C 5/00 (2006.01)
H05B 6/64 (2006.01)
(Continued)

(52) U.S. Cl.
CPC .............. *G01C 5/005* (2013.01); *B64D 15/12* (2013.01); *B64D 41/00* (2013.01); *B64D 43/00* (2013.01);
(Continued)

(58) Field of Classification Search
CPC .. G01C 5/005; G01P 5/16; H05B 6/64; H05B 6/80; H05B 2214/02; B64D 15/12; B64D 15/22; B64D 41/00; B64D 43/00
See application file for complete search history.

(56) References Cited

U.S. PATENT DOCUMENTS 5,588,804 A * 12/1996 Neely ................... F04D 29/326
416/223 R
6,550,344 B2 * 4/2003 Bachinski ............. G01P 13/025
73/861.05
(Continued)

FOREIGN PATENT DOCUMENTS

WO 1991011676 A2 8/1991
WO WO-2016135061 A1 * 9/2016 .............. G01P 5/165

OTHER PUBLICATIONS

NASA, Shape Effects on Drag, Mar. 8, 2000, NASA (Year: 2000).*
(Continued)

*Primary Examiner* — Dana Ross
*Assistant Examiner* — Bryan M Badalamenti
(74) *Attorney, Agent, or Firm* — Wood Herron & Evans LLP

(57) ABSTRACT

An air data probe (10) and associated method of method of measuring air data is disclosed. The air data probe includes a plurality of air pressure sensors, and a body (14) that encloses a hollow interior cavity (16), where the body (14) has a generally symmetrical airfoil profile. The body (14) includes a plurality of projections (20a-d) extending beyond the generally symmetrical airfoil profile, each of the plurality of projections (20a-d) including an pressure port (22a-d) at a distal end (24a-d) that is in communication with the hollow interior cavity. Each of the pressure ports (22a-d) receives a corresponding air pressure sensor (12a-d) that is configured to collect static and dynamic air pressure data.

14 Claims, 13 Drawing Sheets

(51) Int. Cl.
*B64D 15/12* (2006.01)
*B64D 41/00* (2006.01)
*B64D 43/00* (2006.01)
*G01P 5/16* (2006.01)

(52) U.S. Cl.
CPC ............... *G01P 5/16* (2013.01); *H05B 6/64* (2013.01); *H05B 2214/02* (2013.01)

(56) References Cited

U.S. PATENT DOCUMENTS

| | | |
|---|---|---|
| 2007/0073485 A1 | 3/2007 | Manfred et al. |
| 2009/0311096 A1 | 12/2009 | Herr et al. |
| 2014/0230539 A1 | 8/2014 | Perju et al. |
| 2014/0251001 A1 | 9/2014 | Doolittle et al. |
| 2016/0291051 A1* | 10/2016 | Golly ................ G01P 1/026 |

OTHER PUBLICATIONS

International Search Report and Written Opinion in International Patent Application No. PCT/US2017/058756, dated Jan. 4, 2018, 10 pgs.

* cited by examiner

AIR DATA PROBE

CROSS-REFERENCE TO RELATED APPLICATIONS

This application claims the benefit of U.S. Provisional Patent Application No. 62/413,653, filed on Oct. 27, 2016, the disclosure of which is expressly incorporated by reference in its entirety herein.

TECHNICAL FIELD

The present invention relates generally to air data probes, and more particularly, to air data probes for aircrafts to measure local static and dynamic air pressure using air pressure sensors from which to determine the aircraft's airspeed, angle of attack, angle of side slip and barometric altitude.

BACKGROUND

Aircraft are able to maintain airborne by an aerodynamic lift force produced by their wing airfoils. An aircraft maneuvers and maintains stability by aerodynamic forces, normal or transversal to the aircraft longitudinal axis, produced by the control surfaces, which are airfoils. Airfoils on a plane produce lift force by interacting with the oncoming airflow at an incident angle known as the Angle of Attack ("AOA"). The produced lift force is substantially linear under a critical value of AOA, but then reverses when that critical AOA value is exceeded; this situation is known as stall. The incident angle for transversal lift is known as Angle of Sideslip ("AOS").

The loss of flight capability of an otherwise intact aircraft is known as Loss of Control ("LOC") and it is the main cause of fatal accidents in commercial and general aviation flights. In-flight LOC of an otherwise intact aircraft occurs when one or more airfoils stall. Recent statistics show that in-flight LOC remains number one cause of accidents and fatalities in commercial, general as well as experimental (self-built) aircraft aviation. Automatic and autonomous flight control for nominal as well as LOC prevention and recovery require accurate and reliable measurements of AOA and AOS. Reliable AOA and AOS measurement can also be used in a pilot warning system to prevent LOC.

Several commercial devices have been developed over the history of aviation with the aim of providing the needed readings of the aerodynamic attitude variables mentioned above. Initial approaches were made using mechanical devices that rotated into the same direction of the wind. For example, an early device designed to measure and transmit, by means of electrical signals, the direction of airstream in the horizontal and vertical axes. The use of mechanical moving elements was the preferred means used in several posterior designs, with certain modifications to improve the response of the devices. Another presents an improvement to the mechanical coupling of the moving element meant to be adjustable according to the flight conditions of the aircraft. However, the mechanical elements also known as wind vanes, are susceptible of being damaged by external objects or getting stuck due to environmental conditions.

Other developed instruments use dynamic pressure to calculate AOA and AOS. One presents the design of a multifunction probe with orifices located on its surface meant to allow for airflow to enter pressure sensors' ports. The values of AOA, AOS and wind speed are calculated using the dynamic pressure detected by the pressure sensor through the orifices. The inconvenience faced by pressure sensing devices of this kind, is that they malfunction when the pressure ports are clogged by external agents. The damage caused to the probes can render the data unreliable, which may lead to LOC, or even fatal accidents.

Current air data sensors generally rely on mechanical moving mechanisms or stagnation pressure measurements, which induce turbulence, aerodynamic drag, and are susceptible to measurement noise, malfunction and failure due to turbulence, icing and obstruction by foreign objects. For example a current AOA/AOS sensors use a wind vane design that is susceptive to measurement noise, malfunction and damage due to turbulence and foreign object obstruction, due to its mechanical moving parts. Current airspeed sensors employ the pitot tube, that is prone to be obstruct by foreign objects such as ice, birds or insects.

AOA/AOS, airspeed and (barometric) altitude measurements are relevant data in automatic/autonomous flight control systems for nominal flight and LOC prevention and recovery. Recently, some AOA/AOS sensors using pressure measurement measure air data (AOA, AOS or air speed) by measuring the incident stagnation (ram air) pressure, and infer AOA and AOS by the pressure difference at different location and angles of the probe. Such probes have reported a limited range of +/−15 degrees of AOA/AOS measurement, which does not include the more critical and useful range of post-stall angles.

As a result, there is a need for an air data probe with a profile that measures accurate and reliable AOA, AOS, airspeed and (barometric) altitude and that eliminates moving parts and pressure ports, thereby eliminating the sensor failing due to mechanical malfunction or obstruction of sensor orifices and reducing turbulence and air drag caused by the air data probe. Therefore, a need exists for an improved air data probe.

SUMMARY

According to an exemplary embodiment, an air data probe includes a plurality of air pressure sensors, and a body that encloses a hollow interior cavity, where the body has a generally symmetrical airfoil profile, where the body includes a plurality of projections extending beyond the generally symmetrical airfoil profile, each of the plurality of projections including an pressure port at a distal end that is in communication with the hollow interior cavity, and where each of the pressure ports receives a corresponding air pressure sensor configured to collect local static and dynamic air pressure data.

According to some embodiments, the plurality of projections extend beyond the symmetrical airfoil shape by a distance that is greater than or at least equal to the thickness of a boundary layer, where the distance allows measurement of the local static pressure that is induced by freestream air flow velocity.

According to some embodiments, the distribution of the pressure ports is both equally around a circumference of the body and at an angle less than 90 degrees relative to the longitudinal axis of the probe.

According to some embodiments, each of the projections has a rearwardly extending portion that terminates at a point that is configured to minimize turbulence caused by the projections and drag of the body of the air data probe.

According to some embodiments, each of the pressure ports and corresponding air pressure sensor are substantially flush with the distal end of the respective projection.

According to some embodiments, each of the air pressure sensors is capable of collecting both the local static and dynamic air pressure data.

According to some embodiments, the generally symmetrical airfoil profile includes a bulbous shaped front portion.

According to some embodiments, the body includes an access hatch having a shape that corresponds to the generally symmetrical airfoil profile to minimize drag.

According to some embodiments, the body further includes a front pressure port that receives a corresponding air pressure sensor configured to collect local static and dynamic air pressure data.

According to some embodiments, internal electronics configured to interpret the local static and dynamic air pressure data produced from each of the plurality of air pressure sensors. According to some embodiments, an electric power supply is configured to supply power to the internal electronics and the pressure sensors, and a data transmission structure is configured to transmit data to a flight computer or display devices within the cockpit of the aircraft. For example, a wireless transmitter may be configured to transmit a wireless signal back to an aircraft. The data may also be transmitted to the flight computer or display devices via a wired connection that also supplies power to the sensors and electronics in the probe, such as a USB cable. According to an exemplary embodiment, a mobile app may enable a smart phone or tablet to display the critical flight data from the air data probe 10, 10a in an intuitive way to a pilot, and generate visual or audio warning signals to the pilot at onset of LOC.

According to some embodiments, the plurality of projections that extend beyond the symmetrical airfoil shape are disposed equally around the circumference of the body. According to some embodiments, measuring of the local static and dynamic air pressure utilizes projections extending beyond the symmetrical airfoil shape that are both disposed equally around the circumference of the body and rotated by an angle less than 90 degrees from the longitudinal axis of the air data probe.

According to some embodiments, a surface heating element configured to de-ice at least the body of the air data probe. The heating element may be a microwave emitter.

According to some embodiments, each of the plurality of air pressure sensors is sealed with an elastic material.

A method of measuring air data is also described. The method includes providing an air data probe including a body that generally encloses a hollow interior cavity, the body having a generally symmetrical airfoil profile, where the body includes a plurality of projections extending beyond the generally symmetrical airfoil profile. The method also includes measuring local static and dynamic air pressure through pressure ports disposed in the plurality of projections using a plurality of air pressure sensors, where the projections extend beyond the symmetrical airfoil surface by a distance that is greater than or at least equal to the thickness of a boundary layer, where the distance allows for measurement of the local static pressure that is induced by freestream air flow velocity of an airfoil when the airfoil moves relative to air.

Other objects, features and advantages of the present invention will be readily understood after reading the following detailed description together with the accompanying drawings.

BRIEF DESCRIPTION OF THE DRAWINGS

The accompanying drawings, which are incorporated in and constitute a part of this specification, illustrate embodiments of the invention and, with a detailed description of the embodiments given below, serve to explain the principles of the invention.

DETAILED DESCRIPTION

Figure 1:
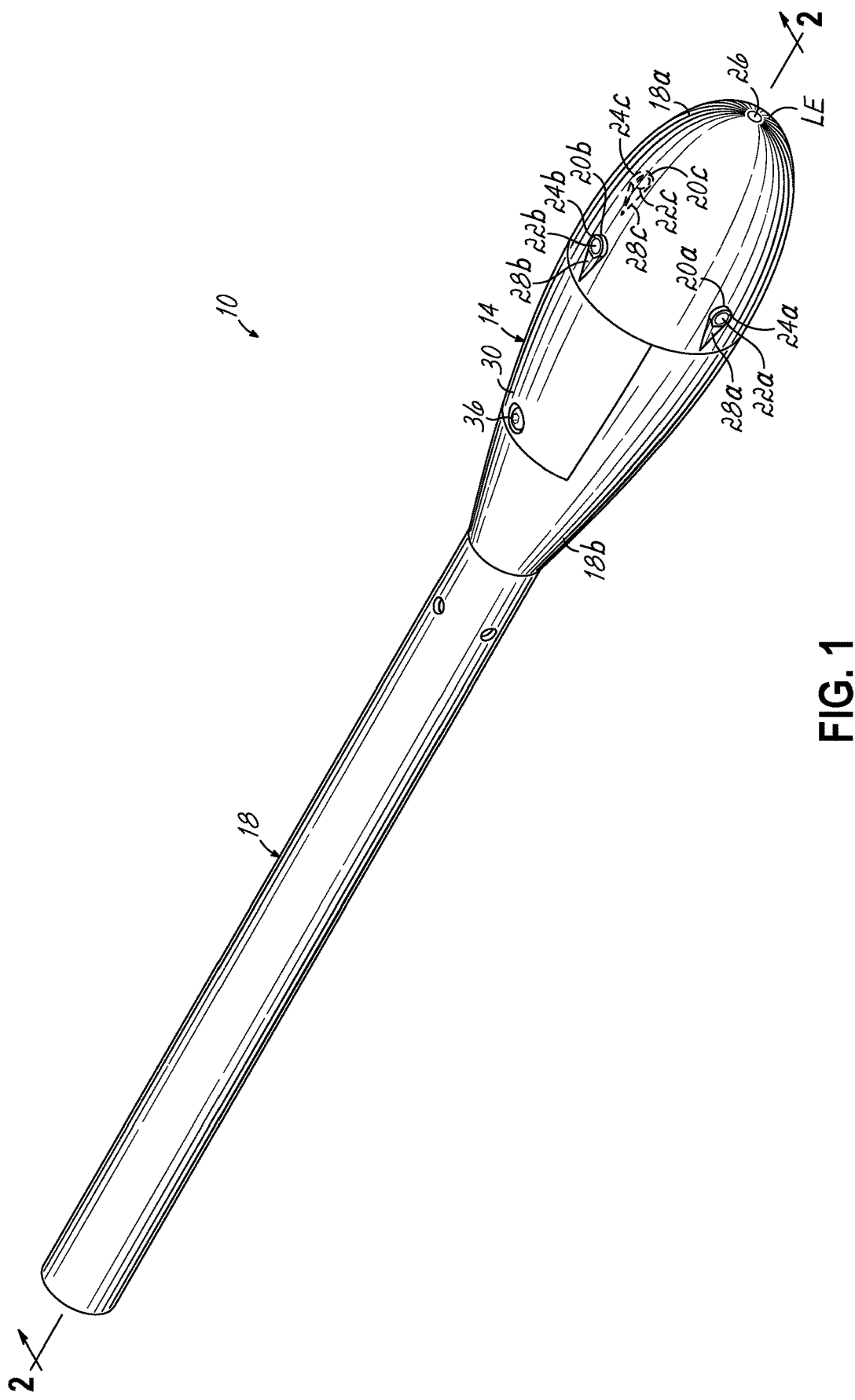
FIG. 1 is a front perspective view of an exemplary air data probe, in accordance with the principles of the present invention.
Figure 2A:
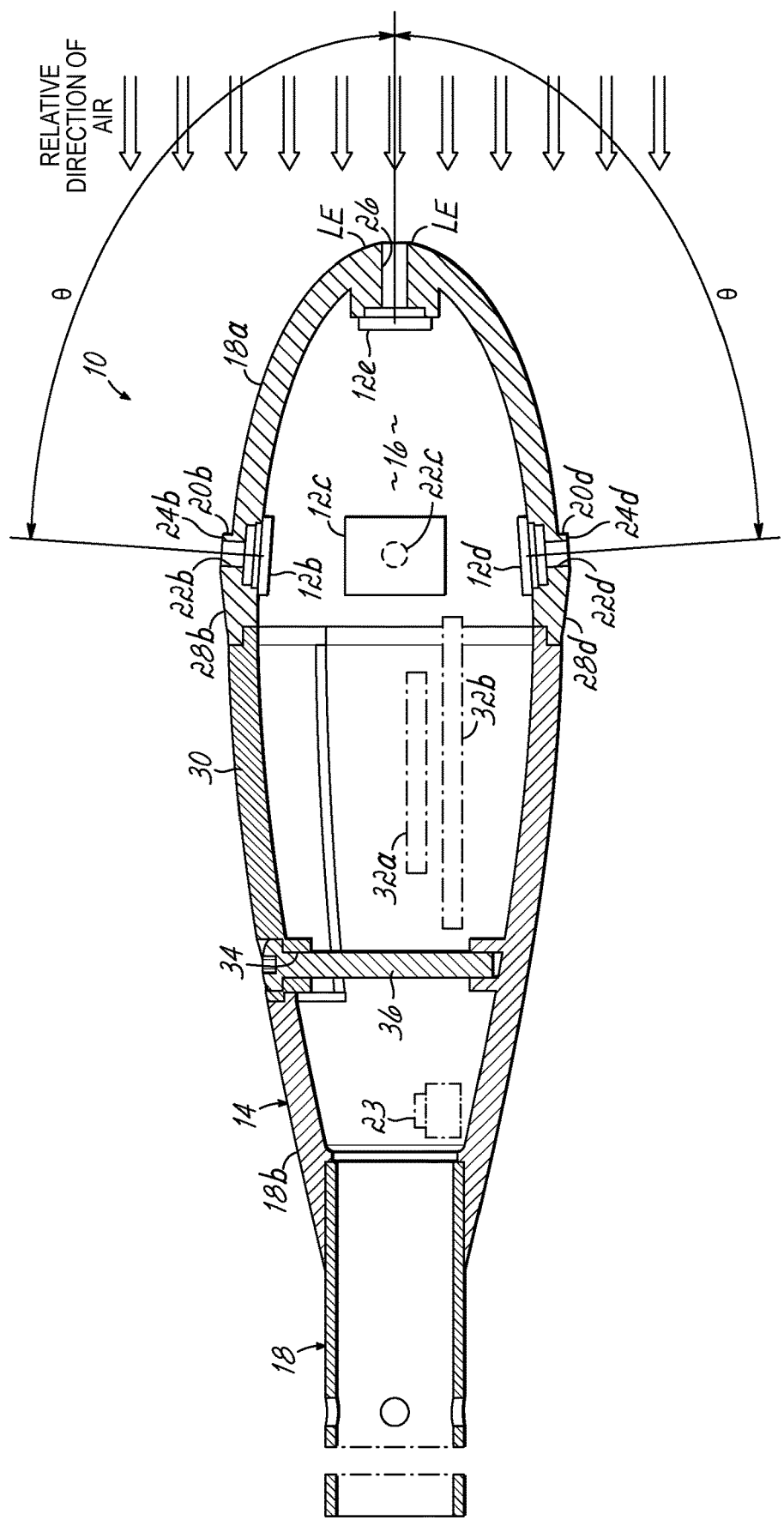
FIG. 2A is a cross-sectional front perspective view of the air data probe of FIG. 1, revealing the hollow interior cavity of the air data probe.
Figure 2B:
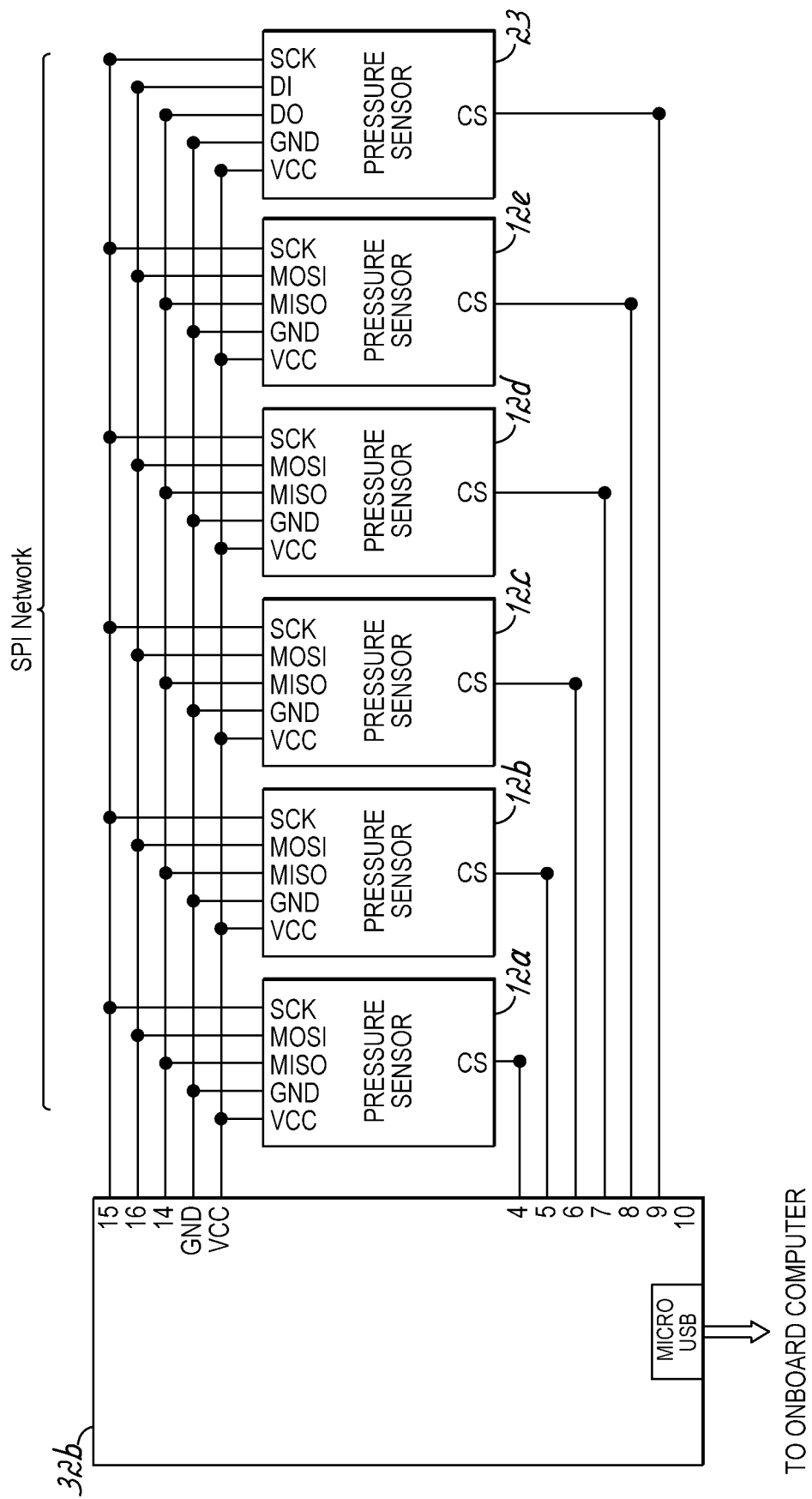
FIG. 2B is a circuit diagram of the exemplary embodiment of FIG. 2A.
Figure 3:
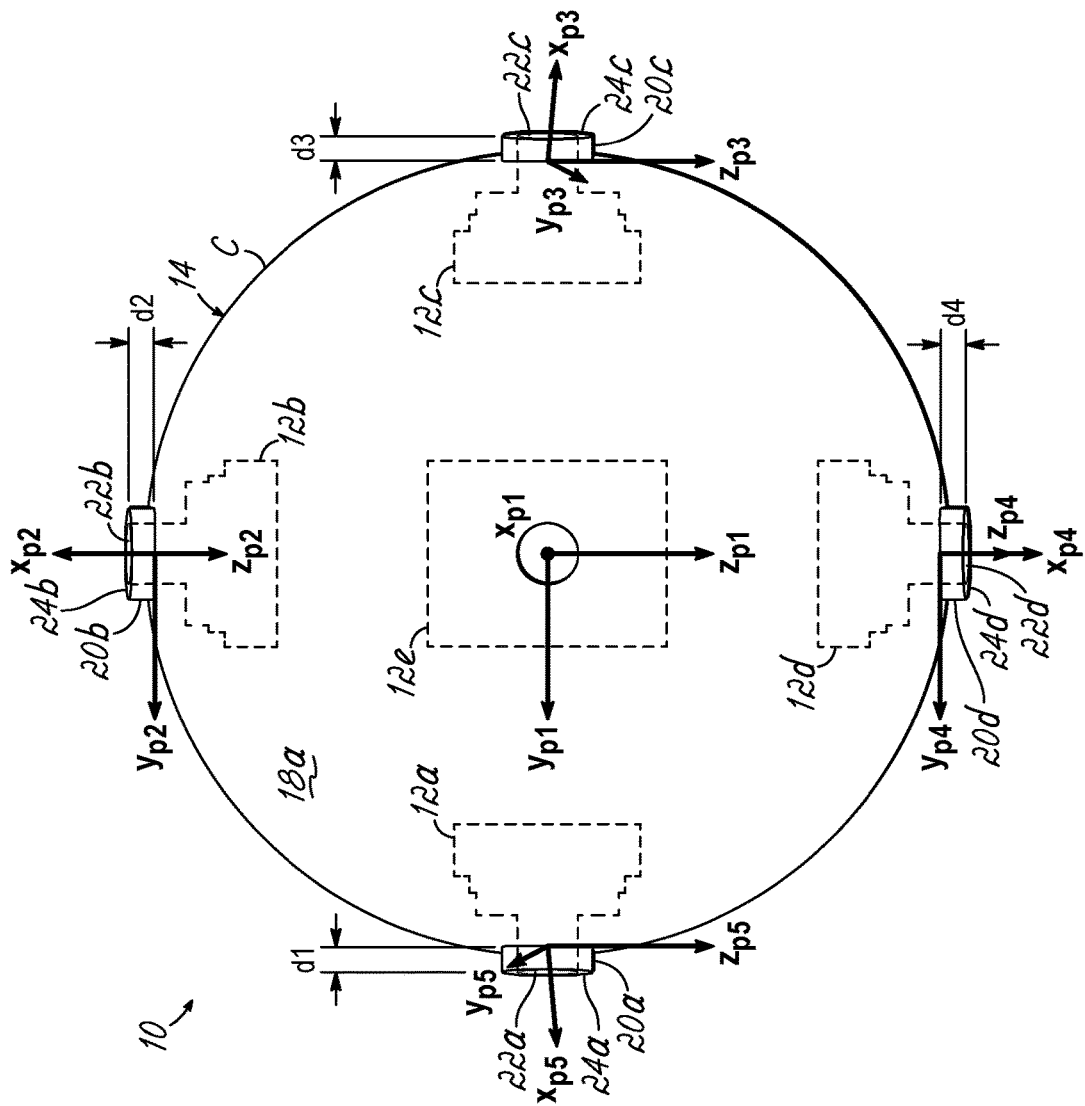
FIG. 3 is a front view of the air data probe of FIG. 1 including reference frames.

Referring now to FIGS. 1-3, with reference to an exemplary embodiment, an air data probe 10 includes a plurality of air pressure sensors 12a-e, and a body 14 that encloses a hollow interior cavity 16. As shown in FIGS. 1 and 2, the body 14 is connected to an elongate shaft 18 that expends from the body 14. As shown in FIG. 2A, the external surfaces 18a-b of the body 14 have a generally symmetrical airfoil profile shape.

As used herein, a symmetrical airfoil shape is one that has identical upper and lower profiles, i.e. the cross-section of the airfoil is symmetrical about the chord line. Such airfoils may be found, for example, in the vertical stabilizer (vertical tail) of an airplane, or the wings for acrobatic aircraft that can fly equally well up-right or upside-down. An exemplary symmetrical airfoil shape is shown in the cross-sectional view of FIG. 2A. When viewed three dimensionally as shown in FIG. 1, the generally symmetrical airfoil profile includes a bulbous shaped front portion, illustrated by external surfaces 18a-b. The leading edge LE is shown in FIGS. 1 and 2A.

With continued reference to FIGS. 1-3, the body 14 includes a plurality of projections 20a-d extending beyond the generally symmetrical airfoil profile. Each of the plurality of projections 20a-d include a pressure port 22a-d at a distal end 24a-d that is in communication with the hollow interior cavity 16. Each of the pressure ports 22a-d receives a corresponding air pressure sensor 12a-d that is configured to collect local air pressure data. According to an exemplary embodiment, each of the pressure ports 22a-d and corresponding air pressure sensor 12a-d are substantially flush (i.e. level or even) with the distal end 24a-d of the respective projection 20a-d. Logically, each of the pressure ports 22a-d is bounded by walls. FIG. 2A also references the pressure port reference frame rotation angle theta (θ). While only pressure ports 22b and 22d are shown in FIG. 2A at angle theta, pressure ports 22a and 22c may also be at the same angle theta. As shown in FIG. 2A, an absolute pressure sensor 23 is installed inside the cavity of the probe to measure the barometric altitude.

FIG. 2B shows a circuit diagram connecting pressure sensors 12a-e, the absolute pressure sensor 23, and internal electronics 32a-b according to an exemplary embodiment. As shown in FIG. 2B, wires connect each of the pressure sensors 12a-e to the internal electronics 32a-b of the air data probe 10. These wires are shown FIGS. 5 and 6a for the air data probe 10a.

The plurality of projections 20a-d that extend beyond the symmetrical airfoil shape may be disposed equally around the circumference (C) of the body 14. As shown, since four side projections are utilized according to an exemplary embodiment, each of these projections is disposed 90 degrees from each another. However, if three side projections are utilized, each of these projections is disposed 120 degrees from each another. Likewise, if two side projections are utilized, each of these projections is disposed 180 degrees from one another. While not shown, it is envisioned that the plurality of projections 20a-d may not extend equally around the circumference of the body 14.

As shown, the body 14 further includes a front pressure port 26 that receives a corresponding air pressure sensor 12e configured to collect local static local pressure data.

Now with reference to FIG. 3, the plurality of projections 20a-d extend beyond the symmetrical airfoil shape by a distance (d1-d4) that is greater than or at least equal to the thickness of a boundary layer. This distance d1-d4 allows for measurement of the local static pressure that is induced by freestream air flow velocity, as will be discussed in greater detail below. As shown, the distribution of the pressure ports 22a-d is both equally around the circumference of the body 14 and at an angle (theta) that is less than 90 degrees relative to the longitudinal axis of the probe (along the lengthwise dimension). As shown in FIGS. 1 and 2, each of the projections has a rearwardly extending portion 28a-d (with 28c being hidden from view) that comes to a point to minimize turbulence caused by the projection and the drag of the body 14 of the air data probe 10. In FIG. 3, the respective x, y, and z coordinates show the expected pressures corresponding to particular AOA, AOS and airspeed, which facilitate the calculation of theoretical expected values.

Each of the air pressure sensors 12a-d is capable of collecting both local static and dynamic air pressure data. Each of the plurality of air pressure sensors may be sealed with an elastic material.

As shown, the body 14 includes an access hatch 30 having a shape that corresponds to the generally symmetrical airfoil profile to minimize drag. The access hatch 30 may be secured using a screw 36 through a threaded aperture 34.

Internal electronics 32a-b are configured to interpret the local static and dynamic air pressure data produced from each of the plurality of air pressure sensors. An electric power supply is configured to supply power to the internal electronics and the pressure sensors, and a data transmission structure is configured to transmit data to a flight computer or display devices within the cockpit of the aircraft. For example, the electric power supply may be a battery configured to supply power to the plurality of air pressure sensors and internal electronics. A wireless transmitter may be configured to transmit a wireless signal back to an aircraft. Alternatively, a communications cable (such as a USB cable) may extend from the air data probe that would be connected with a computer on the respective aircraft and supply electrical power to the electronics and sensors inside the probe.

A surface heating element (not shown) may be configured to de-ice at least the body 14 of the air data probe. According to an exemplary embodiment, the heating element may be a microwave emitter.

A method of measuring air data is also described. The method includes providing an air data probe including a body 14 that generally encloses a hollow interior cavity, the body 14 having a generally symmetrical airfoil profile, where the body 14 includes a plurality of projections extending beyond the generally symmetrical airfoil profile. The method also includes measuring local static and dynamic air pressure through pressure ports disposed in the plurality of projections using a plurality of air pressure sensors, where the projections extend beyond the symmetrical airfoil surface by a distance that is greater than or at least equal to the thickness of a boundary layer, where the distance allows for measurement of the local static pressure that is induced by freestream air flow velocity of an airfoil when the airfoil moves relative to air.

The air data probe 10 with a streamlined airfoil profile allows for accurate and reliable AOA, AOS, wind speed and (barometric) altitude measurements using air pressure sensors 12a-e, thereby eliminating moving parts and orifices, while reducing turbulence and air drag caused by the air data probe. The air data probe 10 improves the accuracy and reliability of aerodynamic attitude measurement, and eliminates moving mechanical parts on typical air data probes; thereby, improving maintainability and reliability. The air data probe 10 minimizes the aerodynamic turbulence created by the probe while taking advantage of the difference of the pressure produced by the aerodynamic profile. The air data probe 10 also considers the effect of the boundary layer when measuring local static pressure.

Accurate and reliable measurement of the angle of attack (AOA), angle of side slip (AOS), airspeed, and (barometric) altitude is relevant to autonomous and automatic flight controllers as well as for loss of control prevention and recovery systems for manned aircraft. The advantages of the air data probe 10 relative to other probes include at least the following reasons: (1) the air data probe contains no moving mechanical parts. (2) AOA and AOS are determined by measuring local static pressures at low AOA/AOS and both local and dynamic pressures at high AOA/AOS, rather than the stagnation pressures as other pressure AOA and AOS probes do, which: (a) provides more predictable and accurate measurements and low AOA (almost linear) and high post-stall AOA, (b) allows surface-mount pressure sensors to be used to eliminate the problem of obstruction by foreign objects, which makes it more reliable, (c) together with a surface heating element, the probe is all-weather capable, and (d) eliminates turbulence and reduces aerodynamic drag. (3) Employs a symmetric airfoil profile to maximize the circulation, increasing the AOA/AOS measurement range while reducing aerodynamic drag. (4) Readily integrates the wind speed and (barometric) altitude measurement with AOA and AOS sensing. This data allows for automatic flight control and LOC prevention and recovery. (5) The air data probe 10 may be made with a polymeric material (such as plastic).

The air data probe may be made using a 3D printer with built-in electronic circuitry, which would reduce costs, and allow for easy retrofitting onto an existing aircraft with minimal alteration to the airframe or installed instrumentation. The elevated sensor port is also streamlined to reduce turbulence which may promote early stall and reduce the quality of the measurements (i.e. introduce noise).

The air data probe 10 acquires data of the aerodynamic attitude of an aircraft. The air data probe 10 measures the changes in local static and dynamic air pressure over its surfaces to determine the interaction attitude with the air. The elevated pressure ports provide the advantage of a higher sensitivity in the pressure readings. Additionally, the elevated pressure ports are streamlined to eliminate turbulence, which provides noise free and steady readings and extends the measurable range of AOA/AOS. Employing an airfoil profile and elevating the pressure sensor ports to above the boundary layer allows for accurate and reliable measurement of the local static air pressure due to the local freestream velocity. The pressure sensors may be sealed with elastic materials to eliminate the problem of obstructions caused by foreign objects (such as, for example, caused by insects or debris), making the air data probe maintenance free and more reliable. Surface heating elements (e.g., the microwave emitted may be added for de-icing, thereby making air data probe operational in all weather conditions. Data processing electronic circuitry may be embedded in the probe for ease of installation and retrofitting existing aircraft.

The use of surface mounted air pressure sensors will eliminate the problem of obstructions by foreign objects such as dust, water drops and insects. The size of the air data probe 10 and its components may be minimized to reduce the drag effect on the aircraft. Surface mounted pressure sensors may be preferable over separate sensor units. Surface mounted pressure sensors eliminate the orifices of the pressure sensor ports, thereby eliminating possibilities for the pressure sensor to be obstructed by foreign objects. Surface mounted air pressure sensors need a customized design making them suitable for future commercial products. The customized design of surface mounted sensors may render them more expensive in the development phase, but the cost should be comparable to separate sensor units when produced in quantity.

An exemplary air data probe was tested, and the results of this testing will now be discussed which takes into account the circulation theory and the boundary layer theory. Relevant terms discussed below include angle of attack or AOA ($\alpha$), sideslip angle ($\beta$), air density ($\rho$), rectilinear flow speed ($V^-$) which is the same as wind speed (V), Circulation flow speed (v), wind speed (V), tangential component of wind speed (V tan), normal component of wind speed (Vnorm), nominal or true wind speed (Vnom), pressure (P), stagnation pressure (Pstag), ambient static pressure ($P_0$), lift force (L), dynamic pressure (Q), lift coefficient (CL), and airfoil area (A).

A. Concepts

Using Circulation Theory, when a circulation flow field and a rectilinear flow field, both are vector fields, are superimposed, the overall flow field closely resembles the flow field around an airfoil at an AOA to the rectilinear flow. The normal velocity component imparts a kinetic normal force. The lateral velocity component induces a local static pressure force normal to the rectilinear flow, which is lower on top of the airfoil than underneath it because of the higher flow speed, thus the net force is a positive lift. Note that the local flow speed is higher on top of the airfoil than underneath it. It is assumed that other types of flow components within the flow field are negligible. Using the Newton's Theory, the normal velocity component $v \cos(\varphi)$, imparts a kinetic force normal to the rectilinear flow, which is a net positive lift force due to a stronger downwash than upwash. Additionally, by the Bernoulli's Theory, the lateral velocity component $V^- + v \sin(\varphi)$ induces a local static pressure force normal to the rectilinear flow, which is lower on top of the airfoil than underneath it because of the higher flow speed, thus the net force is a positive lift. The sum of these two force components is the total normal lift imparted on the airfoil.

Using Circulation Theory, the difference of the local static pressures at a point above and below the airfoil, indicates the strength of the circulation, which is substantially proportional to the AOA before separation of the flow from the airfoil, which happens beyond the critical AOA. Stall occurs when separation of the flow from the airfoil occurs, which significantly weakens the circulation.

Figure 4:
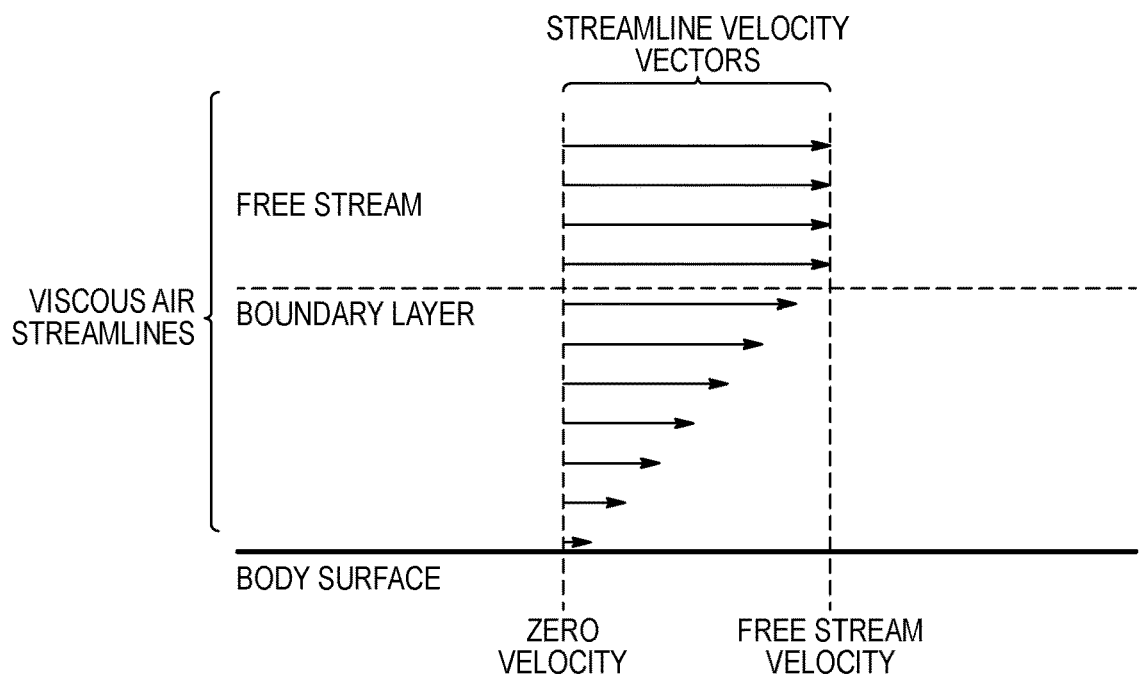
FIG. 4 is a schematic view showing wind velocity vectors near the surface of the body and the boundary layer.

Using Boundary Layer Theory, due the viscous nature of air, the particles of the air that are right next to the surface of the airfoil maintain the same velocity as the airfoil (i.e. their relative velocity is zero). The velocity of the air particles increases as the distance from the airfoil surface increases until they reach free stream velocity. This is shown in FIG. 4. The pressure sampling port is raised by a distance that substantially equals to the thickness of the boundary layer in order to measure the local static pressure induced by the freestream flow speed.

B. Exemplary Embodiment

Figure 5:
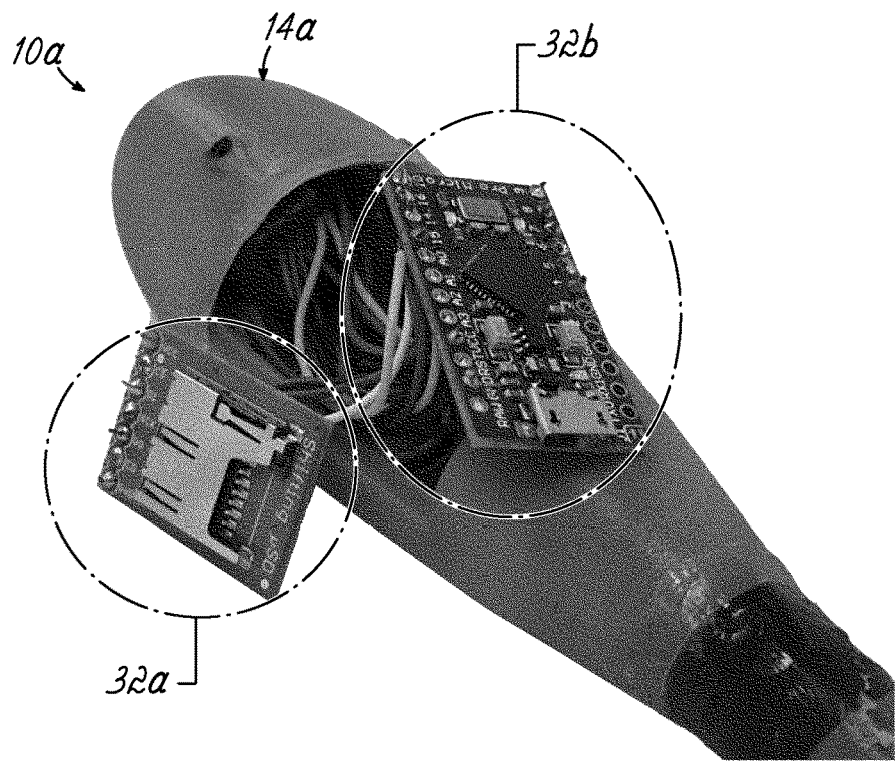
FIG. 5 is a perspective view of an exemplary embodiment of an air data probe with electronic boards including an SD Breakout Board and an Arduino Pro Micro.
Figure 6A:
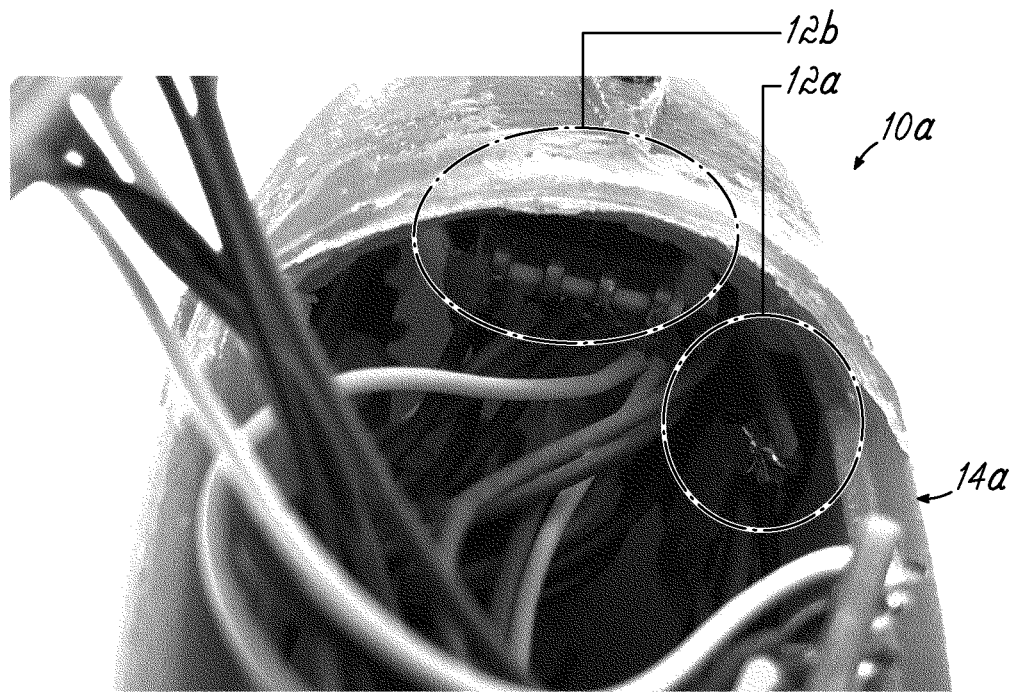
FIG. 6A is a perspective view of an exemplary embodiment for development use of an air data probe with a plurality of air pressure sensors, with the hatch removed to see the internal cavity.
Figure 7:
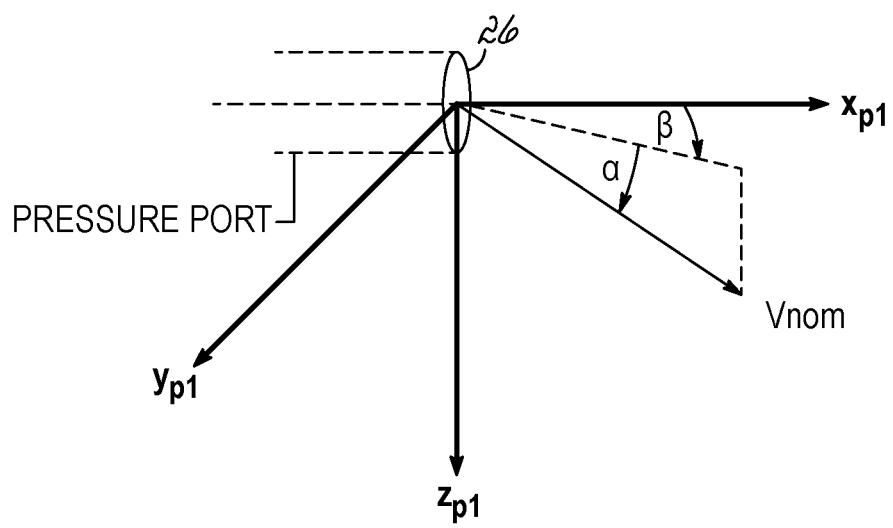
FIG. 7 is schematic view of a wind vector decomposition.
Figure 6B:
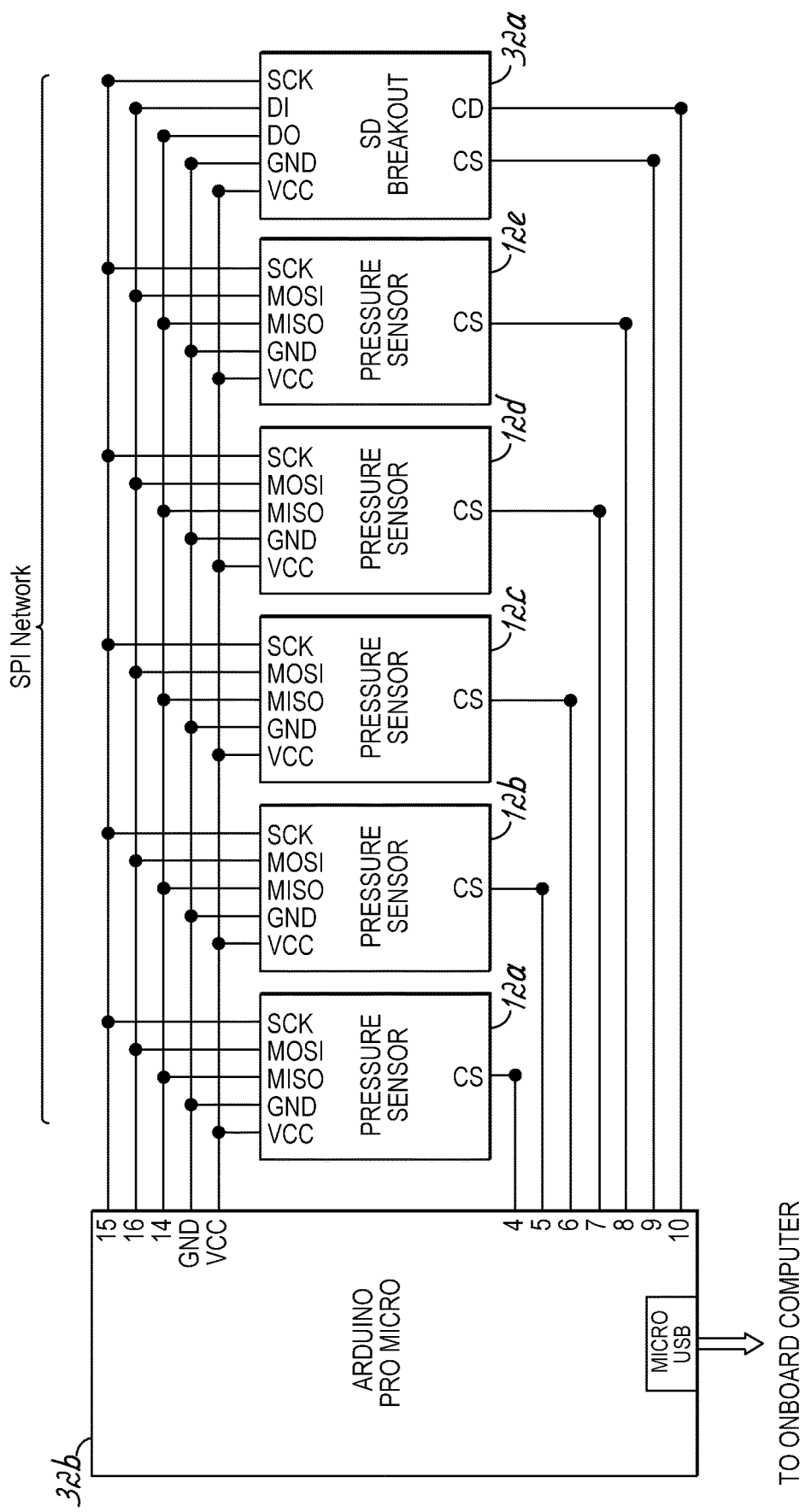
FIG. 6B is a circuit diagram of the exemplary embodiment of FIG. 6A.

Now with reference to FIGS. 5, 6a, and 6b, a standard symmetrical airfoil profile, NACA0025, is used for the air data probe 10a to maximize circulation. Differential pressure sensors are used to measure local static pressures at opposite locations in the normal and lateral planes of the probe for AOA and AOS measurement, respectively. Differential pressure is proportional to the circulation strength, which is in turn proportional to AOA/AOS before separation occurs. By placing the sensor ports further upstream (with the angle θ<90°), differential pressure may be measured even after the stall has occurred, albeit nonlinear with the AOA/AOS.

An air data probe 10a was fabricated with plastic using a 3D printer. The body 14a was fabricated with commonly used printing plastic (PLA). Metal materials, such as aluminum alloy for example, may be used for increased strength and durability.

FIG. 6b shows an electrical diagram of the internal electronics and differential pressure sensors 12a-12e. The differential pressure sensors 12a-12e, for example model HSCDLNN100MDSA5, have a range of ±100 mbar, with a resolution of 14 bit, and an operating voltage of 5 Volts. While the pressure sensors shown and described above are commercial off-the-shelf pressure sensors, surface mounted air pressure sensors may be preferred in order to eliminate the orifices, as described in paragraph [0061] with reference to air data probe 10. Internal electronics 32a, 32b may be located within the air data probe 10. Second, an Arduino Pro-Micro controller board 32b, having an operating range of 5 Volts and 16 MHz. An SD Data Logger board 32a with a SparkFun Level Shifting microSD and an operation voltage of 5 Volts was used for developmental purposes. The SD Data Logger board 32a may be eliminated/omitted for a commercial product.

In this exemplary embodiment of the air data probe 10a, the differential pressure sensor 12a-e are mounted directly in the pressure sensing ports and connected in a SPI network. Pressure ports were connected via plastic tubing to a set of differential pressure sensors for AOA and AOS measurements, and absolute pressure sensors for airspeed and (barometric) altitude measurements. The outputs of which were connected to the interpreting and recording circuitry.

This exemplary embodiment is powered via a USB connection, and it communicates with the commanding aircraft computer through the USB connection. However, other connections are also envisioned, such as, for example, Ethernet, wireless RS232 serial communication, etc. This feature makes the air data probe 10a capable of being integrated with relative ease to existing navigation and early alert systems.

The following analysis of the wind effect on the pressure will use the body-fixed reference frame of the aircraft. The reference frames corresponding to the pressure ports will result from a rotation of this body-fixed frame as seen in FIG. 3. The reference frames corresponding to the pressure ports will result from a rotation of this body-fixed frame as seen in FIG. 3.

The reference frame for Port 1 coincides with the body-fixed frame and does not require a rotational operation. The reference frames for Ports 2 and 4 are obtained by rotating the frame for Port 1 in the vertical plane of symmetry by an angle theta, as shown in FIG. 2A. Similarly, the reference frames for Ports 3 and 5 are obtained by rotating the frame for Port 1 in the horizontal plane of symmetry by an angle theta. In one embodiment, theta was approximately 85.8, and more specifically 85.81 degrees with respect to a leading edge of the air data probe as shown in the cross-sectional view of FIG. 2A.

Results of an Exemplary Embodiment

Figure 8:
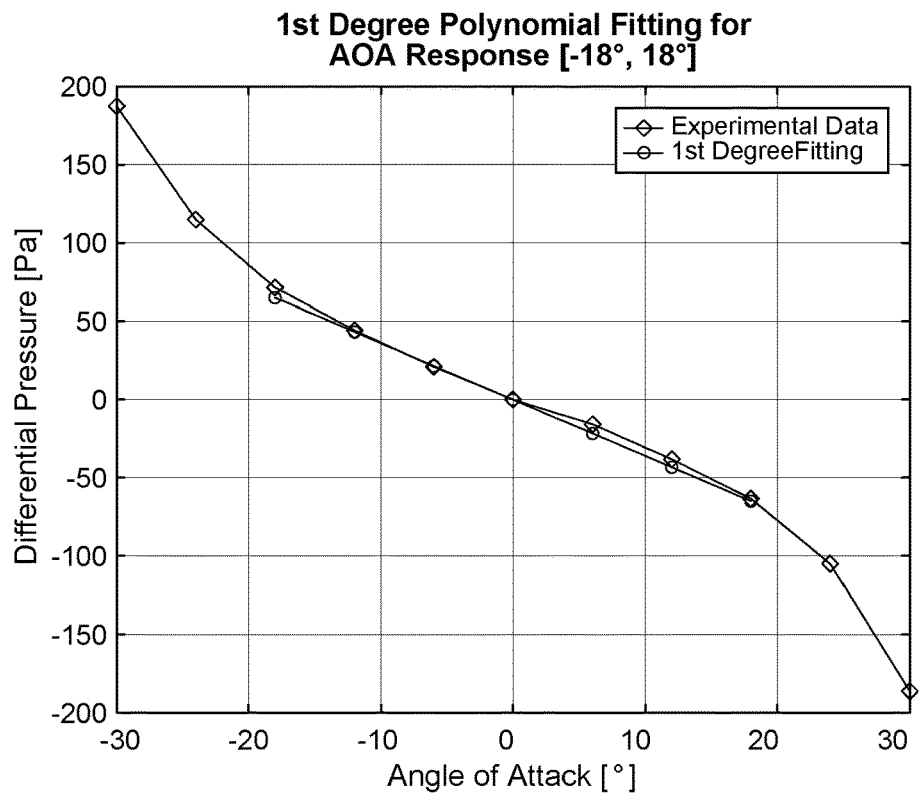
FIG. 8 is a plot of the relationship between experimental values of the differential pressure and angle of attack using a first degree polynomial fitting for AOA within ±18°.

The response curve obtained from the exemplary embodiment indicates an almost linear change of pressure vs. AOA within ±18°, as shown in FIG. 8.

The experimental results can be fitted to a linear equation given by $P=-4.1256\alpha$; with $R^2=0.98244.1256$ m from which the relation to the AOA can be derived and is given by $\alpha=-P/4.1256$. These equations can be used to calculate the AOA in the range of [−18°, 18°], but an extended working range can be obtained by using a higher degree polynomial to obtain a curve fitting for the experimental data.

Figure 9:
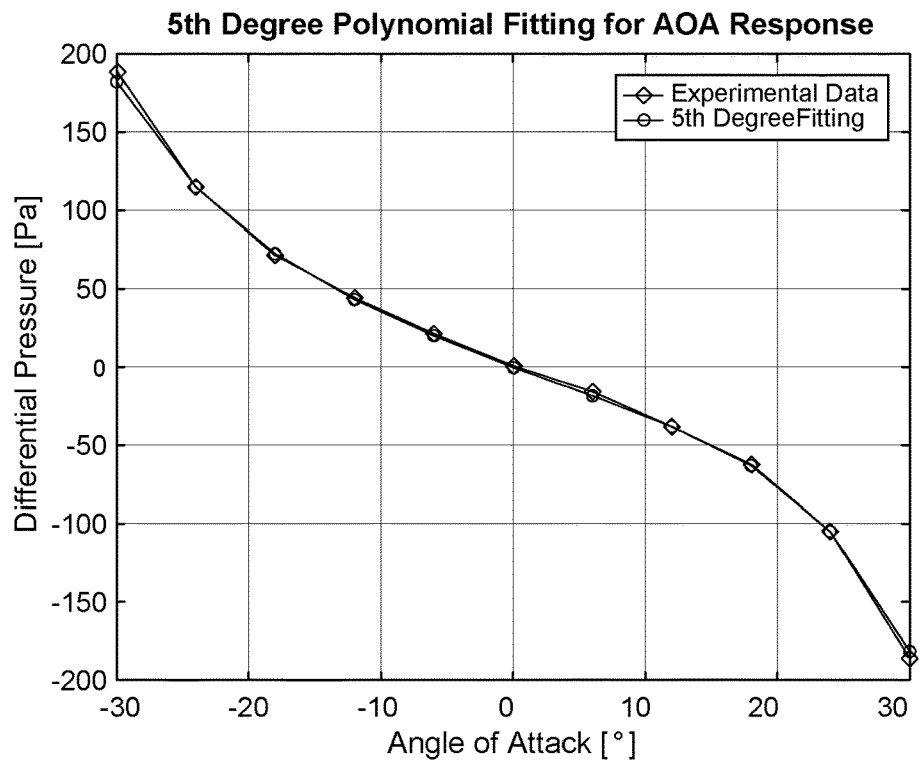
FIG. 9 is a plot of the relationship between differential pressure and angle of attack along using a fifth degree polynomial fitting for AOA within ±30°.

A fifth degree curve fitting can be seen in FIG. 9. This fitting corresponds to the curve which can be used to obtain the corresponding values of AOA for an extended range of [−30°, 30°]. The equation is $.P=-2.3577e^{-6}\alpha^5-2.4558e^{-5}\alpha^4-0.0011048\alpha^3+0.022335\alpha^2-3.1582\alpha$; with $R^2=0.9997$.

Figure 10A:
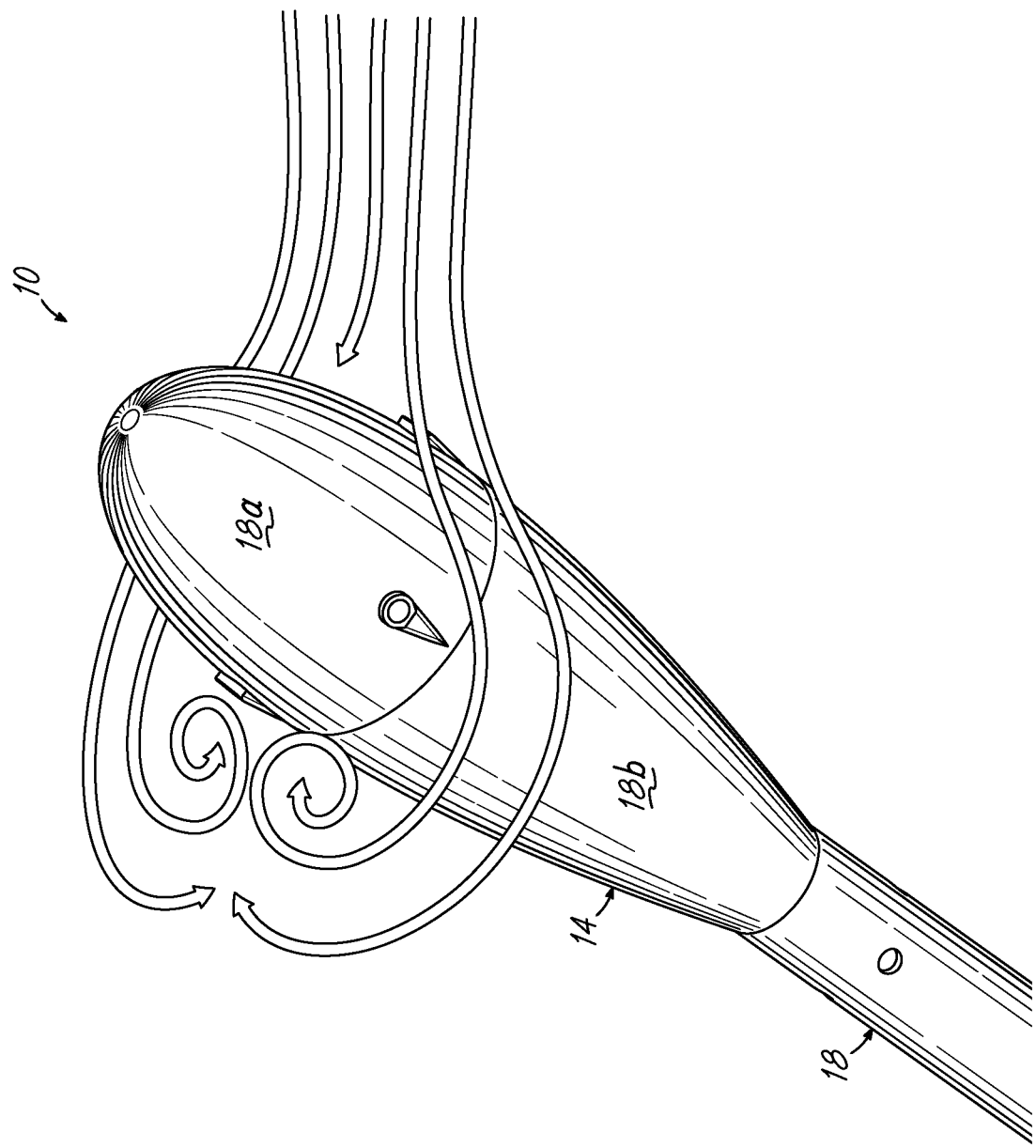
FIG. 10A is a perspective view of blunt body vortices at high AOA and FIG. 10B is a group of cross-sectional perspective views of the body of the air data probe showing the effective probe profile as the Angle of Attack varies.
Figure 10B:
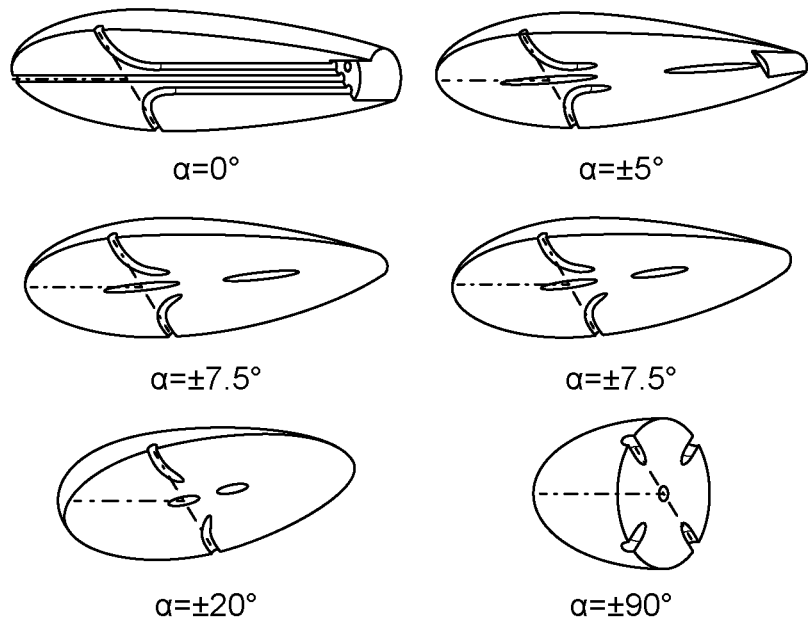

The curvature of the pressure response observed at high values of AOA can be explained considering the change of the effective aerodynamic profile as it changes when AOA varies, as seen in FIG. 10B. As the AOA increases the profile changes from a wind profile at $\alpha=0°$ to the profile of a blunt object at $|\alpha|=90°$. The change in effective profile causes blunt body vortices to build up behind the probe, as seen in FIG. 10A. These vortices cause a change in the pressure measured by the nearest pressure port. In other words, at higher AOA the drag pressure gradually dominates the lift pressure. The probe may be effective even at very high AOA by measuring the drag pressure of a blunt body.

Concerning variable wind speed, the behavior trend of the pressure response was validated when the probe is subjected to different values of wind speed and also to obtain the relationship between the pressure measured for the same AOA at different wind speeds. AOA was varied within ±30° in steps of 5°, while wind speed was varied in steps of 4.5 m/s (10 mph). The relationship between the measurements made at a certain wind speed and the expected measurements to be obtained at a different wind speed can be derived considering the equation for the lift force.

Figure 11:
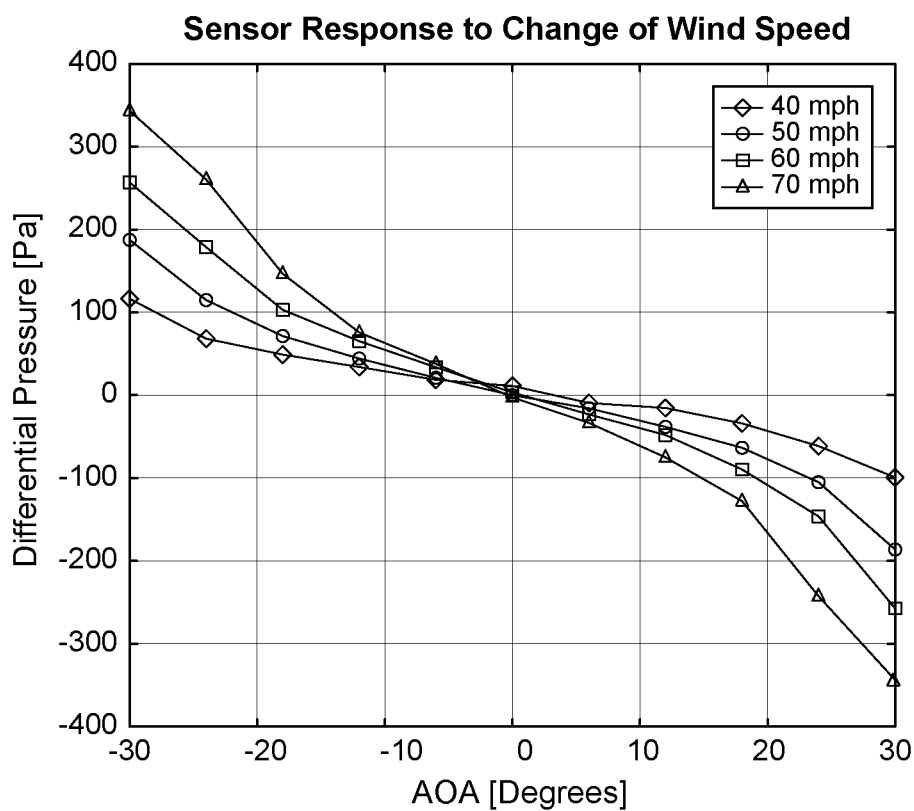
FIG. 11 is a plot of the relationship between experimental values of differential pressure and Angle of Attack varies from −30 degrees to 30 degrees at wind speed of 40, 50, 60, and 70 miles per hour.
Figure 12:
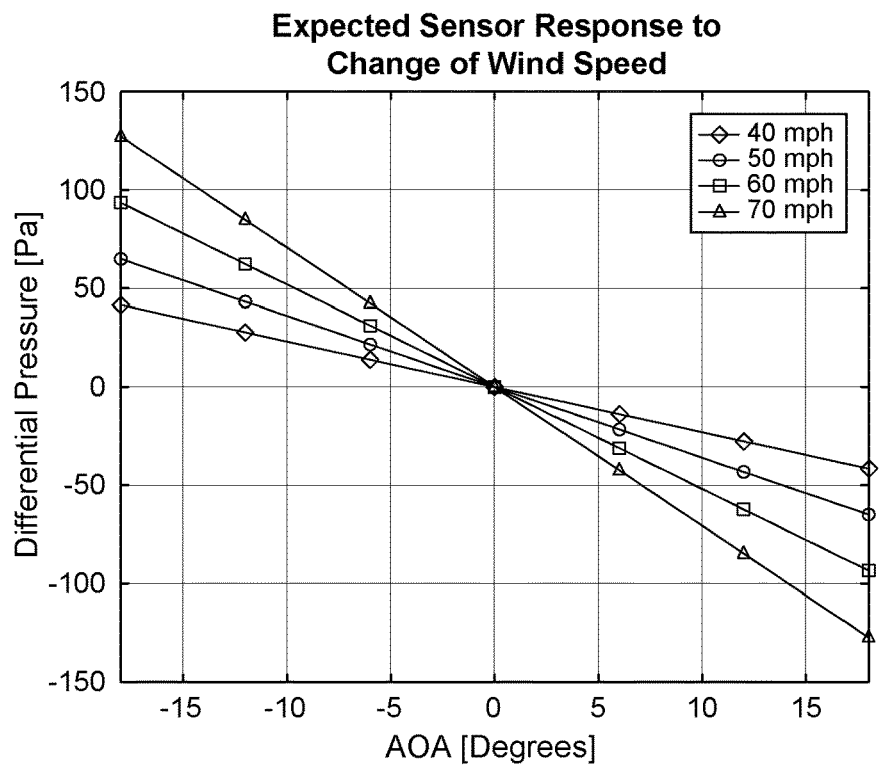
FIG. 12 is a plot of the relationship between expected values of differential pressure based on theoretical analysis, as the Angle of Attack varies from −18 degrees to 18 degrees at wind speed of 40, 50, 60, and 70 miles per hour.

The experimental results of this experiment show agreement with the expected changes of measured differential pressure, as can be seen in FIG. 11. Furthermore, the results also revealed that the pressure measurements are sensitive to variations in temperature.

A linear fitting obtained for each of the data sets, in the range of $|\alpha|\leq 18°$, measured at each of the test wind speed values produces the table below.

| Nom. Wind Speed [m/s](mph) | Slope | Bias | R2 |
|---|---|---|---|
| 18 (40) | −2.2369 | 0 | 0.9744 |
| 22 (50) | −3.6071 | 0 | 0.9921 |
| 27 (60) | −5.1262 | 0 | 0.9935 |
| 31 (70) | −7.1167 | 0 | 0.9842 |

Figure 13:
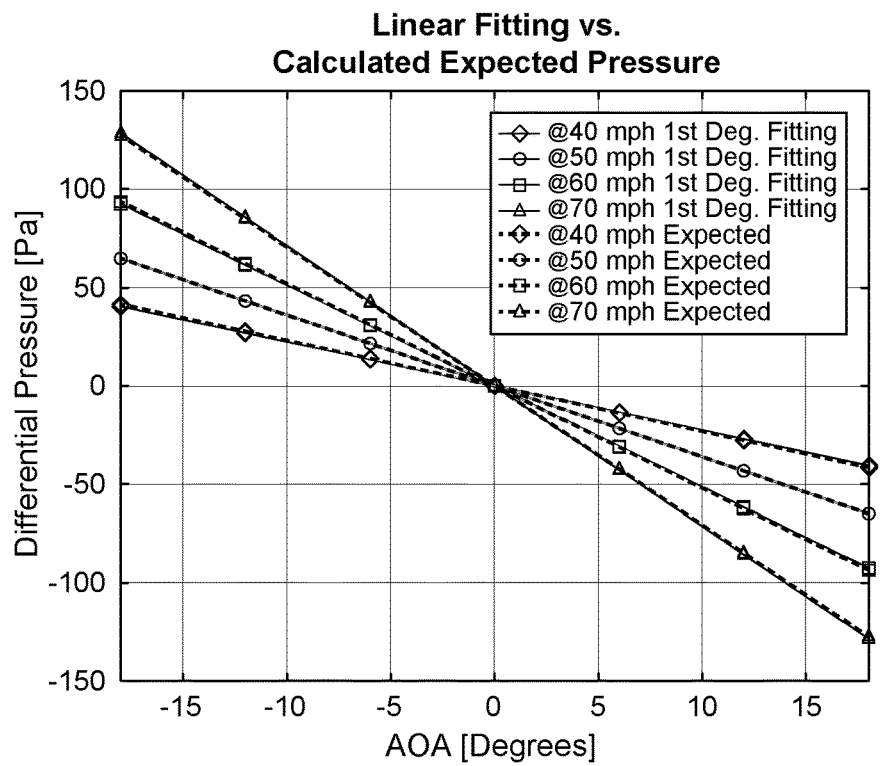
FIG. 13 is a plot of the relationship between experimental and expected values of differential pressure, as the Angle of Attack varies from −18 degrees to 18 degrees at wind speed of 40, 50, 60, and 70 miles per hour.

Using the parameters in this table to calculate the pressure readings, FIG. 13 is produced. This shows that the expected response obtained is in agreement with the experimental measurements of differential pressure.

AOA-AOS Coupled Response

The extent of the coupling exiting between the AOA and AOS pressure responses when these angles vary simultaneously was also observed. When the oncoming air interacts with the air data probe at an AOS different than zero, the effective aerodynamic profile of the probe changes as AOS increases, as shown in FIG. 10B. The change in the shape of the profile produces a change in the differential pressure readings. Since the effective airfoil shape is the same for positive values of AOS and for negative values of AOS, the response of the probe is expected to be an even function about $\beta=0°$.

Figure 14:
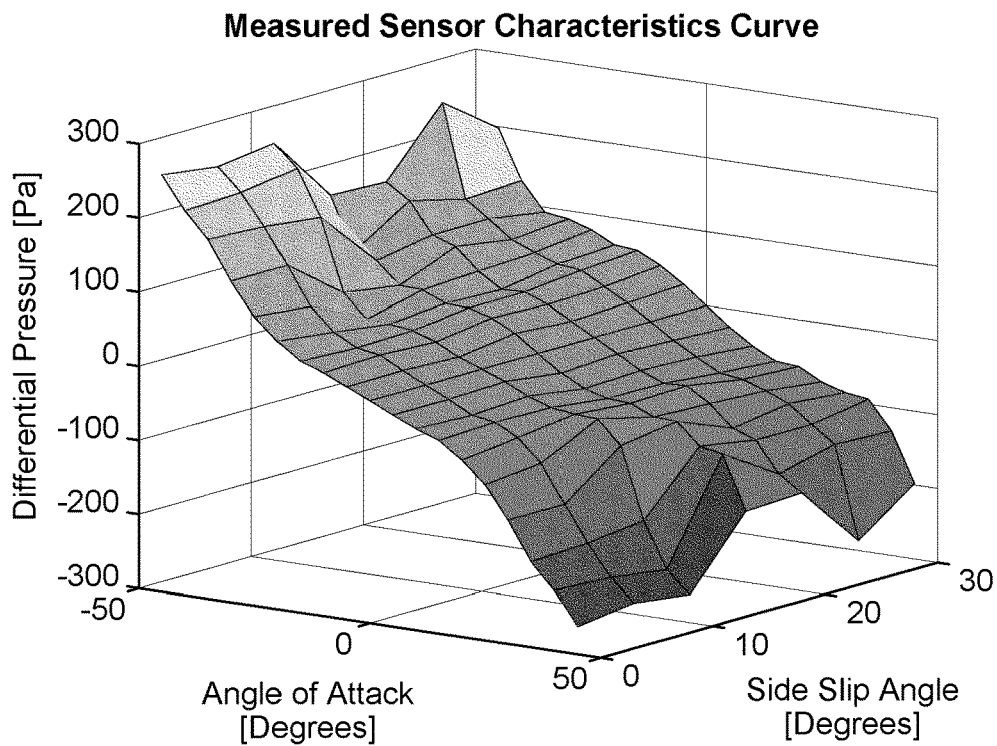
FIG. 14 is a three-dimensional plot of the relationship between experimental values of differential pressure, Angle of Attack, and Side Slip Angle for AOA within ±45° and for AOA within ±30°.
Figure 15:
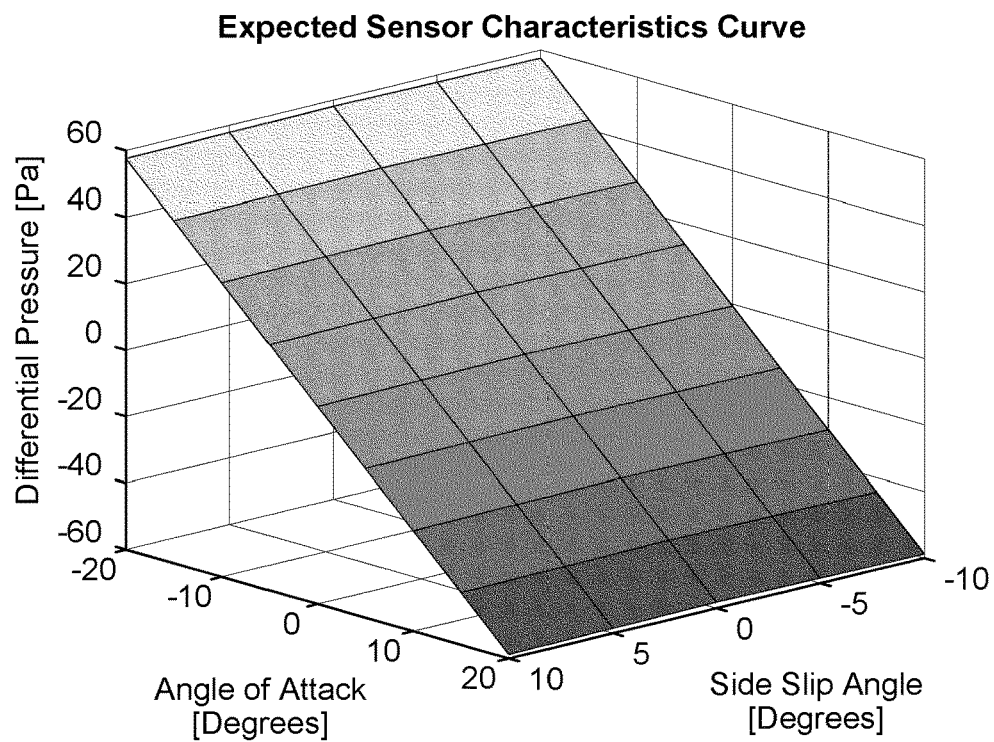
FIG. 15 is a three-dimensional plot of the relationship between expected values of differential pressure, Angle of Attack, and Side Slip Angle for AOA within ±20° and for AOA within ±10°.
Figure 16:
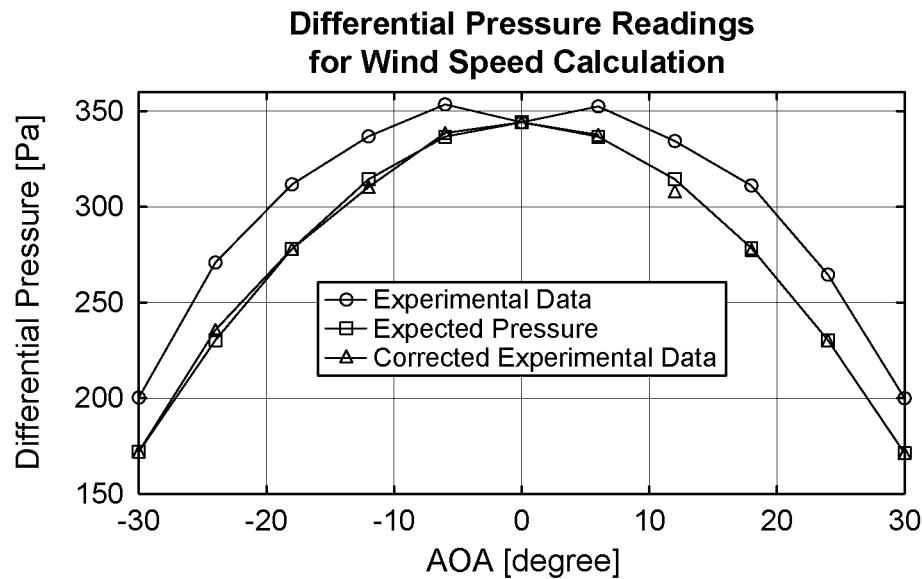
FIG. 16 is a plot of the relationship between raw experimental values of differential pressure and the corrected experimental values, as the Angle of Attack varies from −30 degrees to 30 degrees.
Figure 17:
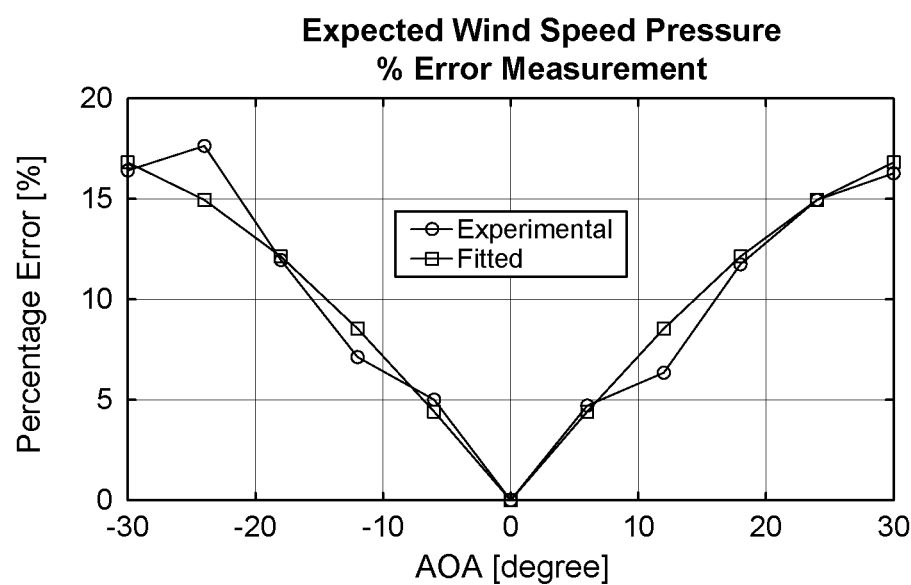
FIG. 17 is a plot of the relationship of the percent error between the experimental and expected wind speed pressure, which can be used to correct the raw experimental data as shown in FIG. 16.

While maintaining constant wind speed, both AOA and AOS were varied and the differential pressures were simultaneously recorded for $|\beta|<10°$. The results of simultaneous measurements of AOA and AOS were obtained, with little coupling effects, as shown in FIG. 14. However, larger coupling effects are expected for larger $|\beta|$ values.

The effect of the change in AOS induces a variation of the measured pressure for AOA. Because the readings of differential pressure for this experiment had to be done at a different room temperature, the equation does not fit the obtained data for AOA measured at $\beta=0°$. Therefore, a new linear fitting was calculated using the measurements of pressure obtained at 22 m/s (50 mph). This fitting corresponds to $P=-5.4595c$, $|\alpha|<18°$.

The expected characteristic curves obtained for $|\alpha|\leq18°$ using the above equation as a reference may be seen in FIG. 2A.

Wind Speed Measurement

The readings of wind speed were obtained using the integrated pitot tube which measures stagnation pressure. The wind speed was calculated at zero AOA.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An air data probe comprising:
   a plurality of air pressure sensors; and
   a body that encloses a hollow interior cavity, wherein the body has a longitudinal axis and a generally axial-symmetrical airfoil profile about the longitudinal axis,
   wherein the body includes a plurality of projections extending radially outwardly from an external surface of the body, each of the plurality of projections including a pressure port at a distal end that is in communication with the hollow interior cavity, and
   wherein each of the pressure ports receives a corresponding air pressure sensor configured to collect local static and dynamic air pressure data,
   wherein each of the projections has a rearwardly extending portion, the projection and the rearwardly extending portion forming a teardrop shape with a rounded portion at an upstream end and a tapered rear section that terminates at a point at a downstream end that is configured to minimize turbulence caused by the projections and drag of the body of the air data probe.

2. The air data probe of claim 1,
   wherein the plurality of projections extend from the external surface of the body by a distance that is greater than or at least equal to the thickness of a boundary layer, and
   wherein the distance allows measurement of the local static pressure that is induced by air flow velocity.

3. The air data probe of claim 1, wherein distribution of the pressure ports is both equally around a circumference of the body and at an angle less than 90 degrees relative to the longitudinal axis of the air data probe.

4. The air data probe of claim 1, wherein the generally axial-symmetrical airfoil profile includes a bulbous shaped front portion.

5. The air data probe of claim 1,
   wherein the body further includes a front pressure port that receives a corresponding air pressure sensor configured to collect the local static and dynamic air pressure data.

6. The air data probe of claim 1, further comprising:
   a pressure sensor located inside the hollow interior cavity that is configured to measure freestream static air pressure to determine barometric altitude.

7. The air data probe of claim 1, further comprising:
   internal electronics configured to interpret the local static and dynamic air pressure data produced from each of the plurality of air pressure sensors.

8. The air data probe of claim 7, further comprising:
   an electric power supply configured to supply power to the internal electronics and the pressure sensors; and
   a data transmission structure configured to transmit data to a flight computer or display devices within a cockpit of an aircraft.

9. The air data probe of claim 1, wherein the plurality of projections are disposed equally around the circumference of the body.

10. The air data probe of claim 1, further comprising:
    a surface heating element configured to de-ice at least the body of the air data probe.

11. The air data probe of claim 10, wherein the surface heating element is a microwave emitter.

12. The air data probe of claim 1, wherein each of the plurality of air pressure sensors is sealed with an elastic material.

13. A method of measuring air data comprising:
    providing an air data probe including a plurality of air pressure sensors and a body that generally encloses a hollow interior cavity, the body has a longitudinal axis and a generally axial-symmetrical airfoil profile about the longitudinal axis, wherein the body includes a plurality of projections extending radially outwardly from an external surface of the body and wherein each of the projections has a rearwardly extending portion, the projection and the rearwardly extending portion forming a teardrop shape with a rounded portion at an upstream end and a tapered rear section that terminates at a point at a downstream end, the rearwardly extending portion being configured to minimize turbulence caused by the projections and drag of the body of the air data probe; and
    measuring local static and dynamic air pressure through pressure ports disposed in the plurality of projections using the plurality of air pressure sensors, wherein the projections extend from the external surface of the body by a distance that is greater than or at least equal to the thickness of a boundary layer, wherein the distance allows for measurement of the local static pressure that is induced by air flow velocity of an airfoil when the airfoil moves relative to air.

14. The method of claim 13, wherein the measuring of the local static and dynamic air pressure utilizes the plurality of projections extending from external surface of the body that are both disposed equally around the circumference of the body and rotated by an angle less than 90 degrees from the longitudinal axis of the air data probe.

* * * * *